April 21, 1931. T. H. THOMAS 1,801,824
BRAKE PRESSURE REGULATOR
Filed Feb. 5, 1929 2 Sheets-Sheet 1

INVENTOR
THOMAS H. THOMAS
BY
Wm. H. Cady
ATTORNEY

April 21, 1931. T. H. THOMAS 1,801,824
BRAKE PRESSURE REGULATOR
Filed Feb. 5, 1929 2 Sheets-Sheet 2

INVENTOR
THOMAS H. THOMAS
BY Wm. N. Cody
ATTORNEY

Patented Apr. 21, 1931

1,801,824

UNITED STATES PATENT OFFICE

THOMAS H. THOMAS, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA

BRAKE-PRESSURE REGULATOR

Application filed February 5, 1929. Serial No. 337,560.

This invention relates to fluid pressure brakes, and more particularly to a fluid pressure brake equipment adapted to be employed in different classes of service, such as passenger or freight service.

Owing to differences in operating conditions, the fluid pressure brake apparatus for passenger service has operating characteristics different from those of the fluid pressure brake apparatus for freight service.

The principal object of my invention is to provide a fluid pressure brake equipment adapted for either freight or passenger service and having means for automatically cutting out of operation the brake controlling features for one class of service while the brake controlling features for the other class of service are cut into operation.

Other objects and advantages will appear in the following more detailed description of the invention.

Figure 1:
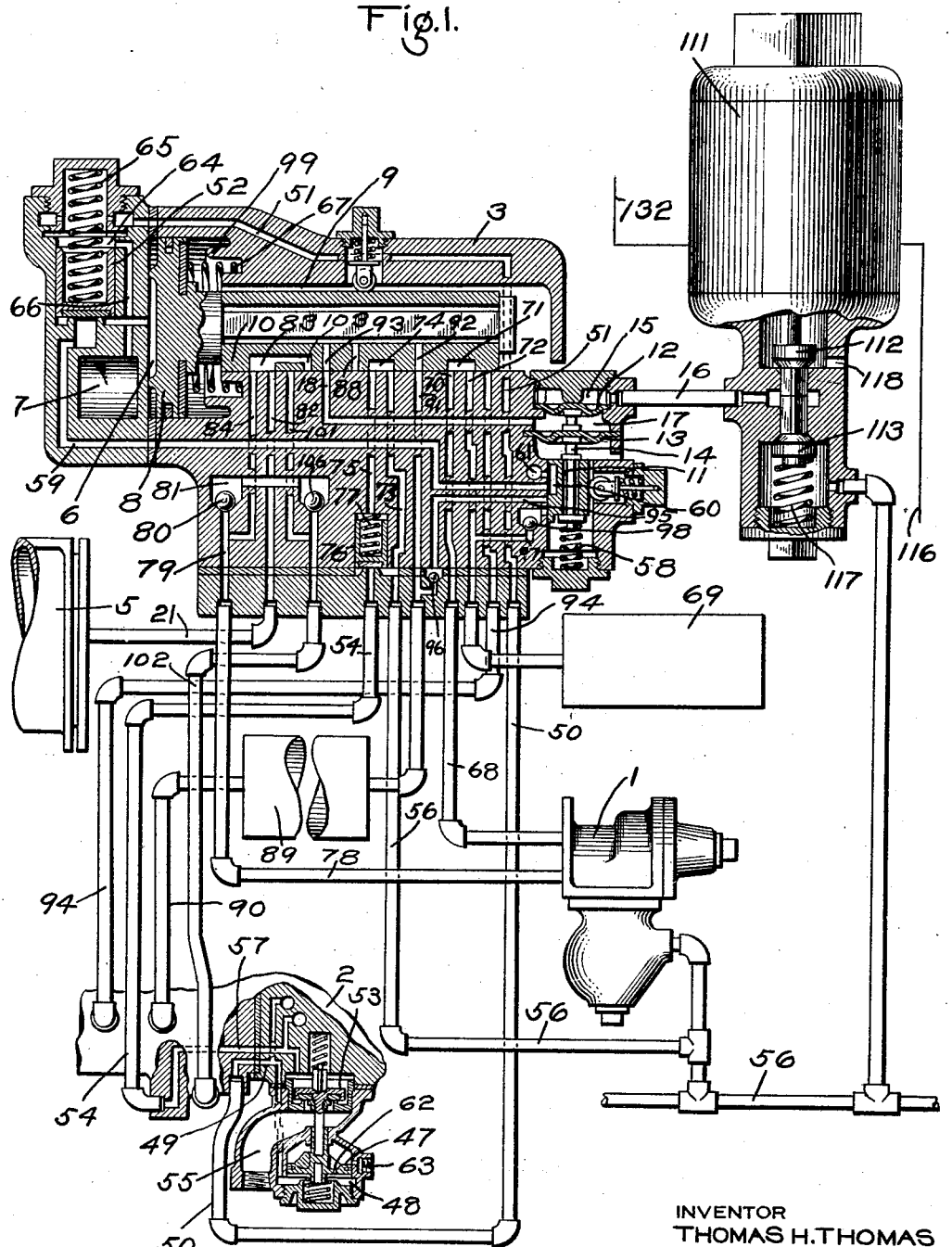

In the accompanying drawing; Figure 1 is a diagrammatic view, partly in section, of a fluid pressure brake equipment embodying my invention; and Fig. 2 a diagrammatic view of a train signal system, showing the controlling magnet of the Fig. 1 construction connected therein.

The equipment may comprise a valve device 1 for controlling the brakes in freight service, a valve device 2 for controlling the brakes in passenger service, a change-over valve device 3 and a brake cylinder 5.

The change-over valve device 3 may comprise a casing having a piston chamber 6, connected to a volume chamber 7, and containing a piston 8, and having a valve chamber 9, constantly open to the atmosphere and containing a slide valve 10 adapted to be operated by piston 8.

A controlling valve device is associated with the change-over valve device and comprises flexible diaphragms 12 and 13, which are operatively connected to a slide valve 11 by a stem 14, the diaphragm 13 being of greater area than the diaphragm 12. The chamber 15 at one side of the diaphragm 12 is connected to a pipe 16, and the chamber 17 intermediate the diaphragms 12 and 13 is connected to a passage 18, leading to the seat of slide valve 10.

Only the quick action portion of the brake controlling valve device 2 is shown, comprising a piston 47, having the chamber 48 at one side connected to a passage 49, through which fluid under pressure is supplied to the quick action piston, by operation of the valve device 2, when an emergency application of the brakes is effected. According to the present invention, a pipe 50 is connected to the passage 49, and said pipe communicates with a passage 51, leading to the chamber at one side of a valve piston 52 of the change-over valve device.

The piston 47 is adapted to operate a vent valve 53 and said valve is adapted to vent fluid from a pipe 54 to an atmospheric exhaust port 55. The pipe 54 is adapted to be connected to the brake pipe 56, when the valve device 2 is cut in for controlling the brakes, and said pipe is connected, through passage 57 with the usual brake pipe connection of the valve device 2.

Figure 2:
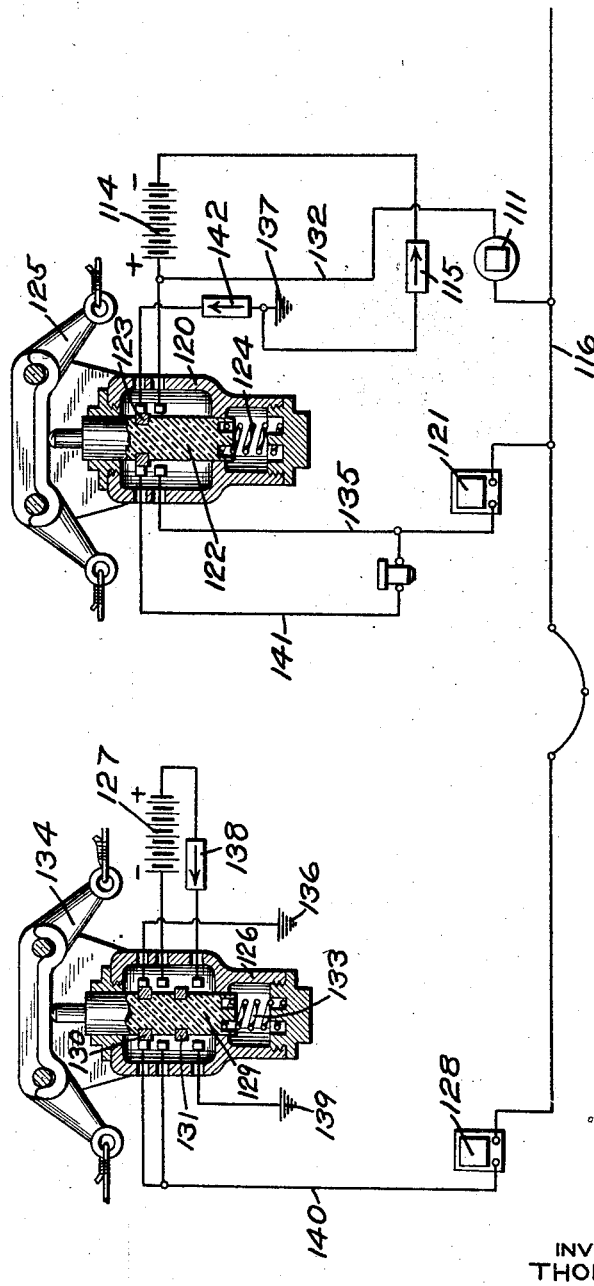

The fluid pressure in chamber 15 is controlled by an electrically controlled signal system, such as employed on a passenger train and such as shown in Fig. 2 of the drawing, and for this purpose a magnet controlled valve device is provided, comprising a magnet 111 and double beat valves 112 and 113 adapted to be controlled by said magnet.

The magnet is shown as connected in a circuit including a source of current 114 and a rectifier 115 which permits flow of current through the magnet in the direction of the arrow, but prevents flow in the opposite direction. The magnet 111 is connected to the train signal wire 116, so that when the car is being operated in passenger service, the energization and deenergization of magnet 111 is controlled through the signal wire.

In operation, if the apparatus is on a car which is being operated in freight service, the train signal wire 116 will be in open circuit, so that the magnet 111 will be deenergized. With magnet 111 deenergized, the valve 113 will be maintained seated by the spring 117 and the valve 112 will be unseated, so that the diaphragm chamber 15 will be vented to the atmospheric port 118. The spring 58 will then maintain the slide valve 11 and the diaphragms 12 and 13 in their upper position, as shown in the drawing. In this position, passage 59, leading to the inner seated area of the valve piston 52, is connected, through cavity 60 in slide valve 11, with an exhaust port 61.

The passage 51 and pipe 50, being connected to piston chamber 48 of the quick action valve device, are normally at atmospheric pressure, since chamber 48 is open, through a restricted port 62 in piston 47, to an atmospheric exhaust port 63. The opposite sides of the valve piston 52 being at atmospheric pressure, the spring 65 holds the valve piston to its lower seat.

In this position, passage 66, leading to volume chamber 7 and piston chamber 6, is open to chamber 64, so that the piston chamber 6 is maintained at atmospheric pressure, and the spring 67 operates to hold the piston 8 and slide valve 10 in the freight service position, as shown in the drawing.

In this position of the change-over slide valve 10, the usual auxiliary reservoir pipe 68 of the freight service triple valve device 1 is connected to the auxiliary reservoir 69, through passage 70, cavity 71 in slide valve 10 and passage 72.

The brake pipe 56 is connected to passage 73 and said passage is connected, through cavity 74 in slide valve 10, with a passage 75, leading to the upper face of a valve piston 76. Brake pipe pressure and the pressure of spring 77 operate to hold the valve piston 76 to its lower seat, in which communication from the brake pipe to the pipe 54 is cut off, and consequently the passenger service brake controlling valve device 2 is rendered inoperative in the freight service position of the change-over valve device.

Pipe 78, through which fluid under pressure is supplied to the brake cylinder, by operation of the valve device 1, is connected to passage 79 and said passage is connected, past check valve 80 to chamber 81, which communicates with brake cylinder pipe 21. Chamber 81 is also connected to passage 82, which passage is connected, through cavity 83 in slide valve 10, with a passage 84, communicating with passage 79, below the check valve 80.

An emergency reservoir 89, which is connected, through pipe 90 with the valve device 2, is also connected to valve chamber 9 and the atmosphere, through passage 91 and port 92. Chamber 17, intermediate the diaphragms 12 and 13, is also connected to valve chamber 9 and the atmosphere, through passage 18 and port 93.

The auxiliary reservoir 69 being connected to pipe 68, the freight triple valve device 1 operates in the usual manner to charge the auxiliary reservoir with fluid under pressure, when the brake pipe is charged with fluid under pressure.

Upon reducing the brake pipe pressure to effect an application of the brakes, the triple valve device 1 operates in the usual manner to supply fluid under pressure from the auxiliary reservoir 69 to pipe 78, and thence to chamber 81 and pipe 21. From pipe 21, fluid under pressure is then supplied to the brake cylinder 5, to effect an application of the brakes, in the usual manner.

The brakes may be released by effecting an increase in brake pipe pressure, so as to operate the triple valve device and cause the pipe 78 to be connected to the usual brake cylinder exhaust port in the triple valve device, so that fluid under pressure is then released from the brake cylinder 5, to effect the release of the brakes.

If a car equipped with the improved brake equipment be connected in a passenger train, the train signal wire 116 circuit will be closed and the magnet 111 will then be energized by current supplied from the source of current 114. The energization of magnet 111 causes the valve 112 to be seated and the valve 113 to be unseated. When valve 113 is unseated, fluid under pressure from a source of fluid pressure, such as the usual brake pipe 56, is supplied through pipe 16 to diaphragm chamber 15. The diaphragm 12 is then shifted downwardly, so that slide valve 11 is shifted to a position in which passage 59 is cut off from exhaust port 61 and is connected, through cavity 60, with a passage 95 which leads, past the check valve 96, to the emergency reservoir 89, and cavity 60 connects with passage 97 containing check valve 98, which passage communicates with the auxiliary reservoir passage 72.

When the auxiliary reservoir 69 is charged with fluid under pressure by operation of the triple valve device 1 upon charging the brake pipe, if the equipment is being initially charged, fluid under pressure is supplied through passage 97 and cavity 60 to passage 59 and acts on the exposed area of valve piston 52. The valve piston 52 is thereupon shifted to its upper seat, permitting the flow of fluid under pressure from passage 59 to volume chamber 7 and piston chamber 6. When the fluid pressure in piston chamber 6 has been increased to a degree sufficient to overcome the pressure of spring 67, the piston 8 and slide valve 10 are shifted to their right hand position, in which piston 8 seats on the annular seat rib 99.

In this position, the slide valve 10 is positioned so that cavity 71 connects passage 72 with the passage leading to pipe 94 and passage 75 is connected to port 88. The upper side of valve piston 76 is thus connected to valve chamber 9 and the atmosphere, so that brake pipe pressure, which acts on the outer seated lower area of the valve piston, operates to shift the valve piston to its upper seat. Communication is then established from the brake pipe 56 to pipe 54, so that the passenger brake controlling valve device 2 is now connected to the brake pipe and the parts of said valve device, including the emergency reservoir 89 are charged with fluid under pressure from the brake pipe.

The auxiliary reservoir 69 is now maintained charged with fluid under pressure as supplied from the valve device 2 through pipe 94, cavity 71 in slide valve 10, and passage 72.

Cavity 83 in slide valve 10 connects passage 82 with passage 101. The pipe 102, through which the brake controlling valve device 2 supplies fluid under pressure to the brake cylinder, is thus connected to chamber 81 and pipe 21.

An extended port 103 of cavity 83 also registers with passage 18, so that diaphragm chamber 17 is charged with fluid under pressure whenever fluid under pressure is supplied to the brake cylinder. The passages 70 and 84 are blanked by the slide valve 10, so that the valve device 1 is now rendered inoperative to control the brakes.

If the brake pipe pressure is reduced to effect an application of the brakes, the valve device 2 is operated to supply fluid under pressure to the pipe 102 and fluid under pressure then flows from chamber 81 to pipe 21 and thence to the brake cylinder 5.

When the brake pipe pressure is increased to effect the release of the brakes, fluid under pressure is released from the brake cylinder by way of pipe 21 and the brake cylinder exhaust controlled by the valve device 2.

If the train signal circuit should open while operating in passenger service, the magnet 111 will become deenergized and the valve 113 will thereupon be moved to its seat, while the valve 112 will be unseated so that fluid is vented from the diaphragm chamber 15. The diaphragms 12 and 13 and the slide valve 11 will then be moved upwardly by the spring 58 to the position in which passage 59 is connected, through cavity 60, with exhaust port 61.

Fluid under pressure is then vented from the under side of valve piston 52, so that spring 65 will shift the valve piston to its lower seat. The charged volume chamber 7 and piston chamber 6 are then connected to passage 51, so that fluid under pressure is supplied through pipe 50 to the under side of the quick action piston 47. The quick action piston is then shifted upwardly so as to unseat the vent valve 53 and thus cause the venting of fluid under pressure from the brake pipe 56 to the atmosphere.

An emergency application of the brakes is thus effected and at the same time fluid under pressure is supplied from the brake cylinder to the diaphragm chamber 17 through passage 82, cavity 83, and a port extension 103 to passage 18 which leads to said chamber.

The pressure in chamber 17 is thus built up and the diaphragms 12 and 13 and the valve 11 are thus shifted to their lower position. Fluid from volume chamber 7 and piston chamber 6 slowly escapes through the restricted port 62 in the quick action piston 47 and before the pressure in piston chamber 6 has been reduced sufficiently to permit the spring 67 to shift the piston to its freight service position, the valve 11 will have been shifted to its lower position by the brake cylinder pressure supplied to diaphragm chamber 17. With valve 11 in its lower position, fluid under pressure is again supplied through passage 59 to the valve piston 52, which is then shifted to its upper seat, so that communication is again opened for the supply of fluid under pressure from passage 59 to volume chamber 7 and piston chamber 6.

The piston 8 and slide valve 10 will thus be maintained in passenger service position, in the event of failure of the train signal circuit.

If the signal circuit is restored, the brakes may be released and the change-over valve device maintained in passenger service position by first releasing fluid from the auxiliary reservoir by operation of the usual auxiliary reservoir release valve (not shown) and by releasing fluid from the emergency reservoir 89.

The valve piston 52 will then move down, so as to connect the volume chamber 7 with passage 51 and fluid under pressure will be supplied to the quick action piston 47. The quick action piston is then shifted to open the vent valve 53, but this will not cause an emergency application of the brakes, because the brake pipe has not been charged with fluid under pressure. The fluid pressure in piston chamber 6 then reduces by flow through the restricted port 62 until the pressure of spring 67 operates to shift piston 8 to its freight service position.

The brake pipe pressure may now be increased to effect the release of the brakes and the brake controlling valve device 1 is operated to effect the release of fluid from the brake cylinder in the usual manner. The diaphragm 12 being again subjected to fluid under pressure in chamber 15 by the energization of magnet 111, the valve 11 is maintained in its lower position, and as the auxiliary reservoir 69 becomes charged with fluid under pressure, the fluid pressure builds up on the lower face of valve piston 52, so that said valve piston is shifted to its upper seat.

Fluid under pressure is then supplied to chamber 7 and piston chamber 6, so that piston 8 is shifted to its passenger service position.

A train signal system adapted for use in connection with my invention is shown in Fig. 2 of the drawings and comprises on the car a manually operable signal controlling device 120, a buzzer 121 of the direct current type, and the source of current 114.

The controlling device 120 comprises a casing containing a plunger 122 having a ring contact 123 and urged upwardly by a spring 124. The plunger 122 is adapted to be shifted by means of a manually operated member 125.

On the locomotive, there is provided a manually operable signal controlling device 126, a source of current 127, and a buzzer 128 of the alternating current type. The controlling device 126 comprises a casing containing a plunger 129 having contact rings 130 and 131. The plunger 129 is urged upwardly by a spring 133 and said plunger is adapted to be operated by a manually operable member 134. On the car, one terminal of the magnet 111 is connected to the train wire 116 and the other terminal by a wire 132 to the positive side of the source of current 114.

When an operator on the car desires to signal the engineer, he operates the member 125 so as to depress the plunger 122 and cause a circuit to be completed from the positive side of the source of current 114, through the contact ring 123 to wire 135 and thence through the buzzer 121 to the train wire 116.

On the locomotive, the train wire 116 is connected through the buzzer 128 and contact ring 130 with the ground at 136 and on the car, the negative side of the source of current 114 is connected to the ground at 137.

A circuit being thus completed, the buzzer 121 of the direct current type operates to make and break the circuit and thereby the A. C. buzzer 128 is caused to vibrate so as to signal the engineer.

If the engineer desires to signal an operator on the car, he operates the controlling member 134 to depress the plunger 129, so that the positive side of the source of current 127 is connected through a rectifier 138 and contact ring 131 with the ground at 139, while the negative side of the source of current is connected, through contact ring 130 with wire 140, which is connected to the train wire 116 through the buzzer 128.

On the car, the buzzer 121 is connected through wire 141 and contact ring 123 with the ground at 137, so that a signal circuit is completed and a signal is made on the car by the operation of the buzzer 121.

It will be noted that the magnet 111 is maintained energized, so long as it is connected in the signal circuit above described, since in the normal position as shown in the drawing, the signal wire 116 is grounded on the locomotive, while on the car, the magnet 111 is connected through wire 132 and the source of current 114 to ground at 137. When the signal controlling device 126 on the locomotive is operated, the train wire 116 continues to be connected to ground at 139, so that the magnet 111 remains energized.

When a car equipped with the above described signal system is detached from the locomotive, the signal wire 116 is no longer connected to ground, so that the magnet 111 becomes deenergized.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. In a fluid pressure brake equipment, the combination with a brake pipe and two brake controlling valve devices, one valve device being operated by variations in brake pipe pressure for controlling the brakes in one class of service and the other valve device being operated by variations in brake pipe pressure for controlling the brakes in another class of service, of mechanism for rendering one of said devices inoperative while the other device is operative to control the brakes, and electrically controlled means for controlling the operation of said mechanism.

2. In a fluid pressure brake equipment, the combination with two brake controlling valve devices, of valve means having positions for rendering either one of said devices inoperative while the other device is rendered operative to control the brakes, valve mechanism for controlling the operation of said valve means, and electrically controlled means for controlling the operation of said valve mechanism.

3. In a fluid pressure brake equipment, the combination with a brake pipe and two brake controlling valve devices, one valve device being operated by variations in brake pipe pressure for controlling the brakes in one class of service and the other valve device being operated by variations in brake pipe pressure for controlling the brakes in another class of service, of valve means operative to render one of said devices inoperative while the other device is rendered operative to control the brakes, an electric train signal system, and means controlled by said signal system for controlling the operation of said valve means.

4. In a fluid pressure brake equipment, the combination with two brake controlling valve devices, of valve means operative to render one of said devices inoperative while the other device is rendered operative to control the brakes, an electric train signal circuit, and means controlled by said circuit for controlling the operation of said valve means.

5. In a fluid pressure brake equipment, the combination with two brake controlling valve devices, of valve means operative to render one of said devices inoperative while the other device is rendered operative to control the brakes, fluid pressure controlled valve mechanism for controlling the operation of said valve means, an electric train signal circuit, and magnet controlled valve means connected in said circuit for controlling the fluid pressure on said valve mechanism.

6. In a fluid pressure brake equipment, the combination with two brake controlling valve devices, of valve means operative to render one of said devices inoperative while the other device is rendered operative to control the brakes, fluid pressure controlled valve mechanism for controlling the operation of said valve means, a normally energized train signal circuit, a magnet in said circuit, and valve means operated by said magnet upon deenergization for varying the fluid pressure on said valve machanism.

7. In a fluid pressure brake equipment, the combination with two brake controlling valve devices, of valve means operative to render one of said devices inoperative while the other device is rendered operative to control the brakes, fluid pressure controlled valve mechanism for controlling the operation of said valve means, a normally energized train signal circuit, a magnet in said circuit, and valve means operated by said magnet upon energization for supplying fluid under pressure to said valve mechanism and upon deenergization for venting fluid from said valve mechanism.

8. In a fluid pressure brake equipment, the combination with two brake controlling valve devices, of valve means operative to render one of said devices inoperative while the other device is rendered operative to control the brakes, fluid pressure controlled valve mechanism for controlling the operation of said valve means, a normally energized train signal circuit, a magnet in said circuit, a brake pipe, and valve means operated by said magnet upon energization for supplying fluid from the brake pipe to said valve mechanism and upon deenergization for venting fluid from said valve mechanism.

9. The combination with two brake controlling valve devices, a magnet, and means operated upon energization of said magnet for rendering one valve device operative and upon deenergization for rendering the other valve device operative, of a train signal system in which said magnet is connected, the magnet being maintained energized when the signal system is in use and deenergized when the signal system is not in use.

10. The combination with an electric train signal apparatus on two vehicles of a train connected in circuit when the two vehicles are connected together, of a brake controlling apparatus on one vehicle including a controlling magnet connected to the train signal circuit, and means for maintaining the magnet energized while the signal circuit of the two vehicles is connected.

11. The combination with a train signal system on a vehicle including a train wire, of a brake controlling apparatus on said vehicle including a controlling magnet connected to said train wire, means for energizing said magnet when the train wire is connected to ground, a signal system on another vehicle connected to a train wire, and means for connecting said train wire to ground, so that when the train wires of the two vehicles are connected, said magnet will be energized.

In testimony whereof I have hereunto set my hand, this 1st day of February, 1929.

THOMAS H. THOMAS.